US006855092B2

United States Patent
Duty et al.

(10) Patent No.: US 6,855,092 B2
(45) Date of Patent: Feb. 15, 2005

(54) THROTTLE CONTROL METHOD AND METHOD OF SELECTING POWERTRAIN OBJECTIVES

(75) Inventors: Mark J. Duty, Goodrich, MI (US); Timothy A Coatesworth, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/623,071

(22) Filed: Jul. 18, 2003

(65) Prior Publication Data

US 2005/0014606 A1 Jan. 20, 2005

(51) Int. Cl.[7] .............................................. F16H 59/30
(52) U.S. Cl. ....................................... 477/121; 477/905
(58) Field of Search .......................... 701/65, 110, 55, 701/56; 477/905, 121

(56) References Cited

U.S. PATENT DOCUMENTS 5,133,232 A * 7/1992 Kikuchi et al. ............... 477/65
5,182,710 A * 1/1993 Tomisawa .................... 701/56
6,044,318 A    3/2000 Bourdon et al.

* cited by examiner

Primary Examiner—Dirk Wright
(74) Attorney, Agent, or Firm—Ralph E. Smith

(57) ABSTRACT

An electronic throttle controller adjusts vehicle acceleration based on accelerator pedal movement. The controller compares a rate of change of a pedal voltage with a rate of change of a filtered pedal voltage. The filtered pedal voltage depends on filter alpha values that vary as a function of engine speed divided by vehicle speed. If the rate of change of the pedal voltage exceeds the rate of change of the filtered pedal voltage by a threshold, the controller selects a performance mode. The performance mode determines how the controller adjusts a transmission ratio and power request damping. Additionally, the controller adjusts a duration of the performance mode based on an acceleration condition. The acceleration condition is indicative of whether engine speed, vehicle speed, and pedal position are constant.

12 Claims, 2 Drawing Sheets

THROTTLE CONTROL METHOD AND METHOD OF SELECTING POWERTRAIN OBJECTIVES

FIELD OF THE INVENTION

The present invention relates to electronic throttle control in a vehicle, and more particularly to electronic throttle control based on rate of change of an accelerator pedal position.

BACKGROUND OF THE INVENTION

An electronic throttle control (ETC) system in a vehicle determines performance of the vehicle based on a performance level request from a driver. The ETC system determines magnitude of accelerator pedal travel at a particular vehicle speed. The response of the vehicle relates to the ratio of pedal travel to vehicle speed. The ETC system may respond to the driver to optimize performance of fuel economy depending on the driver.

For example, the ETC may respond aggressively to attain optimal performance. Conversely, the ETC may delay the response of the vehicle to optimize fuel economy.

SUMMARY OF THE INVENTION

A method for controlling acceleration behavior of a vehicle comprises determining a rate of change of a pedal position. A performance mode is selected based on the rate of change, wherein the performance mode is indicative of performance characteristics of an engine. An acceleration condition is determined. Acceleration is controlled according to the performance mode and the acceleration condition.

In another aspect of the invention, an electronic throttle controller comprises a first module that determines a rate of change of a pedal position. A second module selects a performance mode according to the rate of change. A third module generates an acceleration signal that is indicative of a duration of acceleration. A controller communicates with the second module and the third module and controls acceleration according to the performance mode and the acceleration signal.

In yet another aspect of the invention, an electronic throttle controller comprises a sensor that determines a pedal voltage. A filter filters the pedal voltage to generate a filtered pedal voltage. A comparator compares the pedal voltage to the filtered pedal voltage. A controller communicates with the comparator and selects a performance mode if a rate of change of the pedal voltage exceeds a rate of change of the filtered pedal voltage by a threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
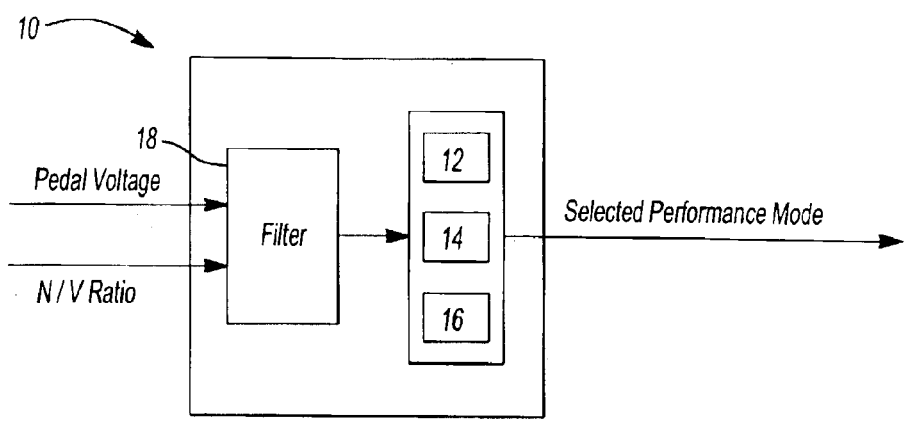
FIG. 1 is a functional block diagram of an electronic throttle control including performance modes according to the present invention.

An ETC 10 determines a performance mode as shown in FIG. 1. For example performance modes may include an economy mode 12; a moderate performance mode 14, and a high performance mode 16. The ETC 10 determines the performance modes based on expectations of a driver.

For example, the economy mode 12 may establish transmission ratios that target optimal fuel economy at a particular performance level. The economy mode 12 may reduce sharp airflow transients by filtering an engine torque request. At cold engine temperatures, the economy mode 12 may increase damping to improve transient fuel efficiency and reduce cold launch emissions. The moderate performance mode 14 may compromise transmission ratios to sacrifice fuel efficiency slightly to achieve more aggressive acceleration. Additionally, there may be minimal or no torque request damping in the moderate performance mode. The high performance mode 16 establishes transmission ratios to target optimal performance. There is no torque request damping and a lead filter may be used to establish aggressive launches.

In one embodiment, the economy mode 12 may improve low speed vehicle control by allowing for minor pedal fluctuations without unintended variation in vehicle speed. For example, a driver may cause minor pedal fluctuations due to rough terrain. In this mode, the ETC 10 may dampen the torque response that is generated due to the pedal fluctuations. The ETC 10 may increase the performance mode if the pedal fluctuations are fast enough to indicate that the driver intends to accelerate.

Still referring to FIG. 1, a filter 18 uses alpha values that vary as a function of engine speed divided by vehicle speed, or N/V ratio. The N/V ratio corresponds to torque multiplication of the vehicle powertrain. For example, a first gear has a higher N/V ratio than a second gear. The alpha value of the filter 18 is directly proportional to the N/V ratio. The filter 18 filters a pedal voltage, which is generated based on pedal position, to determine a filtered pedal voltage. The filtered pedal voltage is compared to the pedal voltage. The ETC 10 selects the performance mode according to a magnitude that a rate of change of the pedal voltage exceeds a rate of change of the filtered voltage. As the N/V ratio and the alpha value increase, the magnitude between the rate of change of the pedal voltage and the rate of change of the filtered pedal voltage increases.

It should be understood that the ETC 10 may select the performance mode based directly upon the rate of change of the pedal voltage. In other words, the performance mode is selected according to a derivative of pedal voltage. However, the pedal voltage signal may be susceptible to transients due to noise and noise spikes. By using the filter 18 as described above, the potential effect of the noise and noise spikes is limited.

In one embodiment, the economy mode 12 may limit power requests during cold engine conditions. During cold engine conditions, a driver may increase airflow to the engine faster than fuel can be delivered through an intake manifold. Conventional transient fuel algorithms may attempt to compensate for the lagging fuel delivery by delivering excess fuel. However, this may result in inefficient combustion and increased emissions. The economy mode 12 may prevent this by capping the maximum alpha value of the filter 18 to limit the rate of change of airflow. When the engine warms up, the cap is removed.

Figure 2:
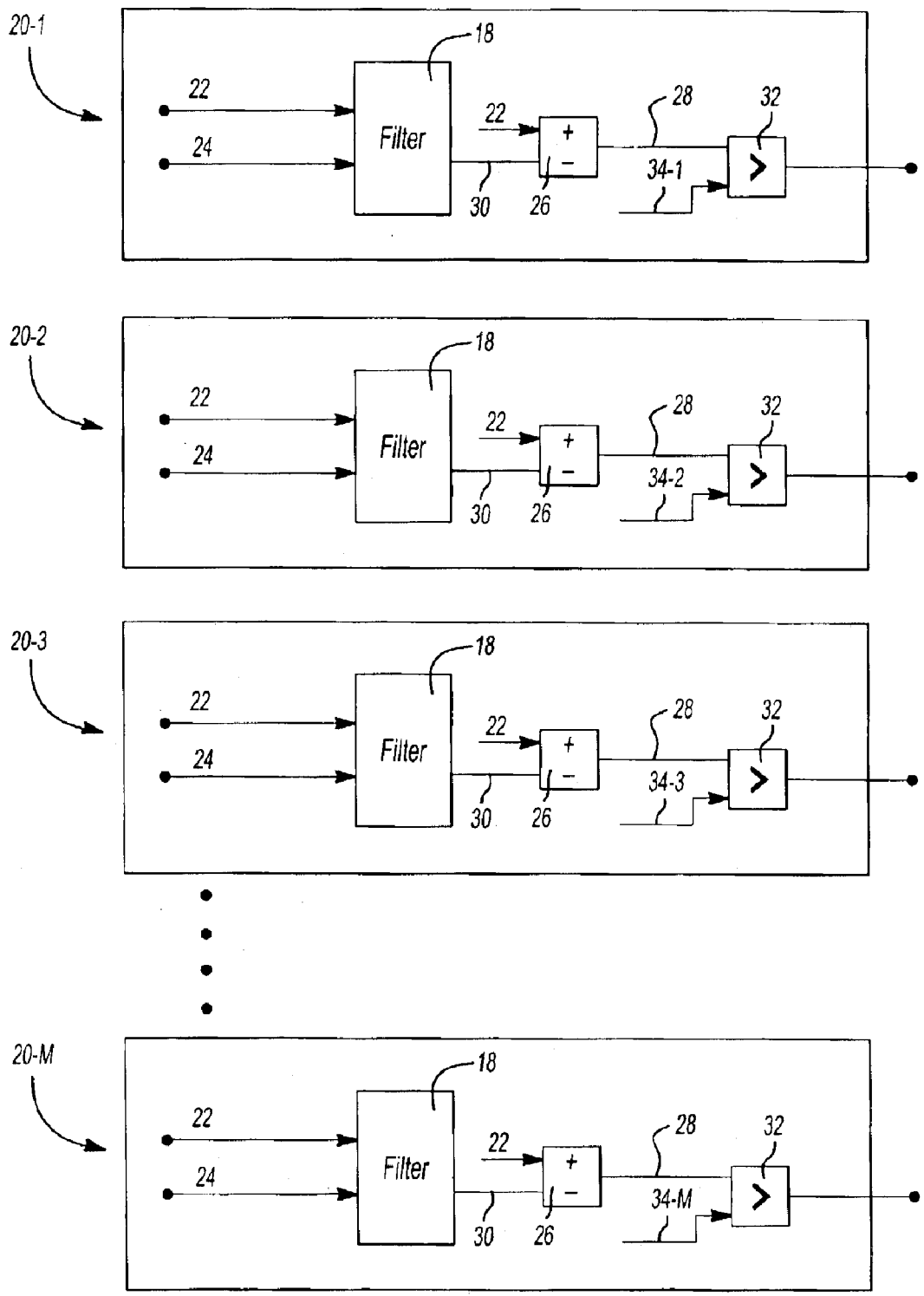
FIG. 2 is a functional block diagram of performance mode selectors according to the present invention.

In the preferred embodiment, the ETC 10 includes performance mode selectors 20-1, 20-2, 20-3 . . . 20-m as shown in FIG. 2. For example, performance mode selector 20-1 may represent optimal fuel economy and performance mode selector 20-m may represent optimal performance. The pedal voltage 22 and the N/V ratio 24 are input to the filter 18. A comparator 26 determines a difference 28 between the pedal voltage 22 and the filtered pedal voltage 30. A relational operator 32 determines whether the difference 28 exceeds a difference threshold 34-1 for the performance mode selector 20-1. The difference threshold 34-2 is greater than the difference threshold 34-1. In other words, each sequential mode selector has a greater difference threshold than a previous mode selector.

If the relational operator determines that the difference 28 exceeds the difference threshold 34-1, the corresponding performance mode for the mode selector 20-1 is selected. The ETC 10 gives priority to the highest performance mode that is selected. For example, if performance modes for mode selectors 20-1, 20-2, and 20-3 are selected, the ETC 10 gives priority to mode selector 20-3. Consequently, the ETC 10 determines that the performance mode corresponding to mode selector 20-3 is proper.

Figure 3:
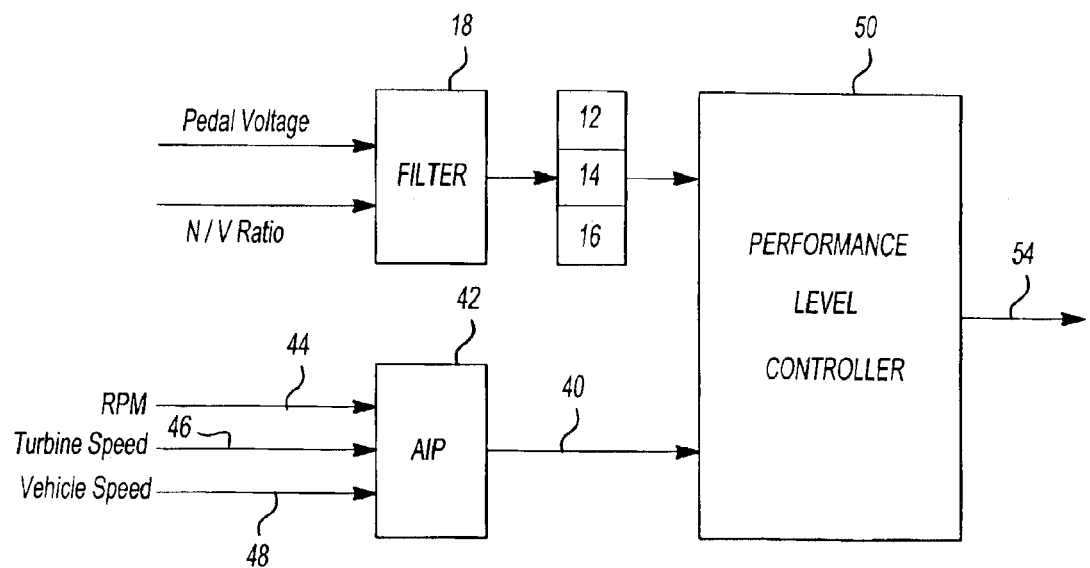
FIG. 3 is a functional block diagram of an electronic throttle control including acceleration determination according to the present invention.

Referring now to FIG. 3, an acceleration signal 40 indicates ongoing acceleration, or acceleration in progress. Pedal movement, engine acceleration, or vehicle acceleration indicate that acceleration is in progress. An acceleration in progress (AIP) module 42 generates the acceleration signal 40 according to vehicle acceleration or near-future vehicle acceleration. For example, the AIP module 42 may determine acceleration based on an RPM signal 44, a turbine speed signal 46, or a vehicle speed signal 48. The acceleration signal 40 toggles between two conditions to indicate that acceleration is in progress or acceleration is completed.

The acceleration signal 40 indicates whether the current selected performance mode is consistent with the behavior of the driver. In other words, the acceleration signal 40 reflects driver intent. Therefore, while the selected performance mode is indicative of the rate of change of the pedal position, the acceleration signal 40 determines a duration of the selected performance mode. The acceleration signal 40 is input to a performance level controller 50. Additionally, the selected performance mode 52 is input to the controller 50. The performance level controller 50 outputs a performance level 54 that is consistent with the selected performance mode 52 for a period determined by the acceleration signal 40. If the acceleration signal 40 indicates that acceleration is complete, the performance level controller 50 cancels the selected performance mode 52 and outputs a default performance level. For example, the default performance level may be the economy mode.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling acceleration behavior of a vehicle comprising:

determining a pedal voltage;

filtering the pedal voltage at a predetermined filter rate (alpha), the predetermined filter rate being a function of an engine speed and a vehicle speed;

determining the difference between the pedal voltage and the filtered pedal voltage;

selecting a performance mode based on the difference, wherein the performance mode is indicative of performance characteristics of an engine;

determining an acceleration condition; and controlling acceleration according to the performance mode and the acceleration condition.

2. The method of claim 1 wherein determining the acceleration condition includes determining the acceleration condition according to at least one of turbine speed, engine speed, vehicle speed, engine acceleration, vehicle acceleration, and pedal movement.

3. The method of claim 1 wherein the performance characteristics include transmission ratio and power request damping.

4. The method of claim 1 wherein controlling the acceleration includes adjusting acceleration according to the performance mode if the acceleration condition is a first value.

5. The method of claim 4 further comprising selecting a default performance mode if the acceleration condition is a second value.

6. The method of claim 4 further comprising maintaining the performance mode for a first period if the acceleration condition is the first value.

7. An electronic throttle controller comprising:

a first module receiving a pedal voltage signal and filtering said pedal voltage signal at a predetermined filter rate (alpha) dependent upon an engine speed and a vehicle speed, and using said pedal voltage and filtered pedal voltage to determine a rate of change of a pedal position;

a second module that selects a performance mode according to the rate of change;

a third module that generates an acceleration signal, wherein the acceleration signal is indicative of a duration of acceleration; and a controller that communicates with the second module and the third module and controls acceleration according to the performance mode and the acceleration signal.

8. The electronic throttle controller according to claim 7 wherein the acceleration signal is a first value if a vehicle speed, an engine speed, and the pedal position are constant.

9. The electronic throttle controller according to claim 8 wherein the acceleration signal is a second value if at least one of the vehicle speed, the engine speed, and the pedal position are not constant.

10. The electronic throttle controller according to claim 9 wherein the controller adjusts the acceleration according to the performance mode if the acceleration signal is the second value.

11. The electronic throttle controller according to claim 7 wherein controlling the acceleration includes at least one of adjusting a transmission ratio and damping a power request.

12. An electronic throttle controller comprising:

a sensor that determines a pedal voltage;

a filter that filters the pedal voltage to generate a filtered pedal voltage, said filter having a predetermined filter rate (alpha) dependent upon an engine speed and a vehicle speed;

a comparator that compares the pedal voltage to the filtered pedal voltage;

a controller that communicates with the comparator and selects a performance mode if a rate of change of the pedal voltage exceeds a rate of change of the filtered pedal voltage by a threshold.

* * * * *